United States Patent [19]
Wu

[11] Patent Number: 5,921,269
[45] Date of Patent: Jul. 13, 1999

[54] TIRE INFLATOR

[76] Inventor: Scott Wu, No. 2, Lane 296, Ming Sheng Road, Wo Feng Hsiang, Taichung Hsien, Taiwan

[21] Appl. No.: 08/885,505

[22] Filed: Jun. 30, 1997

[51] Int. Cl.[6] .................................................. F16K 15/20
[52] U.S. Cl. ........................................ 137/223; 137/231
[58] Field of Search ................................. 137/223, 231, 137/228

[56] References Cited

U.S. PATENT DOCUMENTS

| | | | |
|---|---|---|---|
| 3,926,205 | 12/1975 | Gourlet | 137/223 |
| 4,193,429 | 3/1980 | Devienne et al. | 137/223 X |
| 4,276,898 | 7/1981 | Ross | 137/231 |
| 4,995,417 | 2/1991 | Naku | 137/231 |
| 5,379,796 | 1/1995 | Wang | 137/231 |
| 5,645,100 | 7/1997 | Chuang et al. | 137/223 |
| 5,666,990 | 9/1997 | Wu | 137/223 |
| 5,683,234 | 11/1997 | Chaung et al. | 137/223 X |
| 5,749,392 | 5/1998 | Glotin | 137/231 |

FOREIGN PATENT DOCUMENTS

| | | | |
|---|---|---|---|
| 532760 | 1/1941 | United Kingdom | 137/223 |
| 548165 | 9/1942 | United Kingdom | 137/223 |
| 548787 | 10/1942 | United Kingdom | 137/223 |

*Primary Examiner*—John Rivell
*Assistant Examiner*—Meredith H. Schoenfeld
*Attorney, Agent, or Firm*—Charles E. Baxley, Esq.

[57] ABSTRACT

A tire inflator includes a head portion with a cylinder extending transversely therefrom which communicates with an interior of the head portion via a first passage in which a uni-directional valve is disposed, a disk member slidably received in the head portion, a release valve disposed to the head portion and two receivers respectively received in two open ends of the head portion. The disk member has a radial recess defined radially therein and a slot define in one of two ends thereof and which communicates with the radial recess.

3 Claims, 4 Drawing Sheets

TIRE INFLATOR

BACKGROUND OF THE INVENTION

1. Field of the Invention

The present invention relates to a tire inflator and, more particularly, to an improved tire inflator having two receiver so as to directly engage with two different types of inlet valves without further processes.

2. Brief Description of the Prior Art

Inlet valves of tires seen in the present market include different types such as American type and French type, each of the two types owns a special specification so that different types of tire inflators are required. This is obviously not convenient for users to inflate their bicycle tires. There is a kind of tire inflator claims that different types of inlet valves can be used, however, further processes are required. Furthermore, there are different systems of outlet valves of the inflators to tightly hold the different types of inlet valves of tires, such as by threading or mounting the outlet valve to the inlet valve so that the inflators will not be disengaged from the inlet valves of tires during inflating. This means if users use a tire inflator having a different system from that of the inlet valve of the tire to be inflate, the tire inflator is useless.

Therefore, users need a tire inflator which is convenient for the users to use and properly receives different types of inlet valves without further processes.

The present invention intends to provide an improved tire inflator to mitigate and/or obviate the above-mentioned problems.

SUMMARY OF THE INVENTION

The present invention provides a tire inflator and comprises a head portion and a cylinder portion extending transversely from the head portion wherein the cylinder portion has a piston and a piston rod slidably received therein. The head portion is a tube with two open ends and a first passage is defined transversely therethrough so as to receive a uni-directional valve therein wherein the first passage communicates with an interior of the cylinder portion. An opening is defined transversely through the head portion so as to receive a release valve therein.

Two receivers are respectively and fixedly received in the two open ends of the head portion and each of which has a central passage defined therethrough for receiving an inlet valve therein.

A disk member is slidably received in the head portion and has a radial recess defined in a periphery thereof, a slot defined in a first end of the disk member and communicating with the radial recess.

It is an object of the present invention to provide a tire inflator which is able to receive different types of inlet valves of tires directly.

It is another object of the present invention to provide a tire inflator which tightly holds the inlet valve inserted therein.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
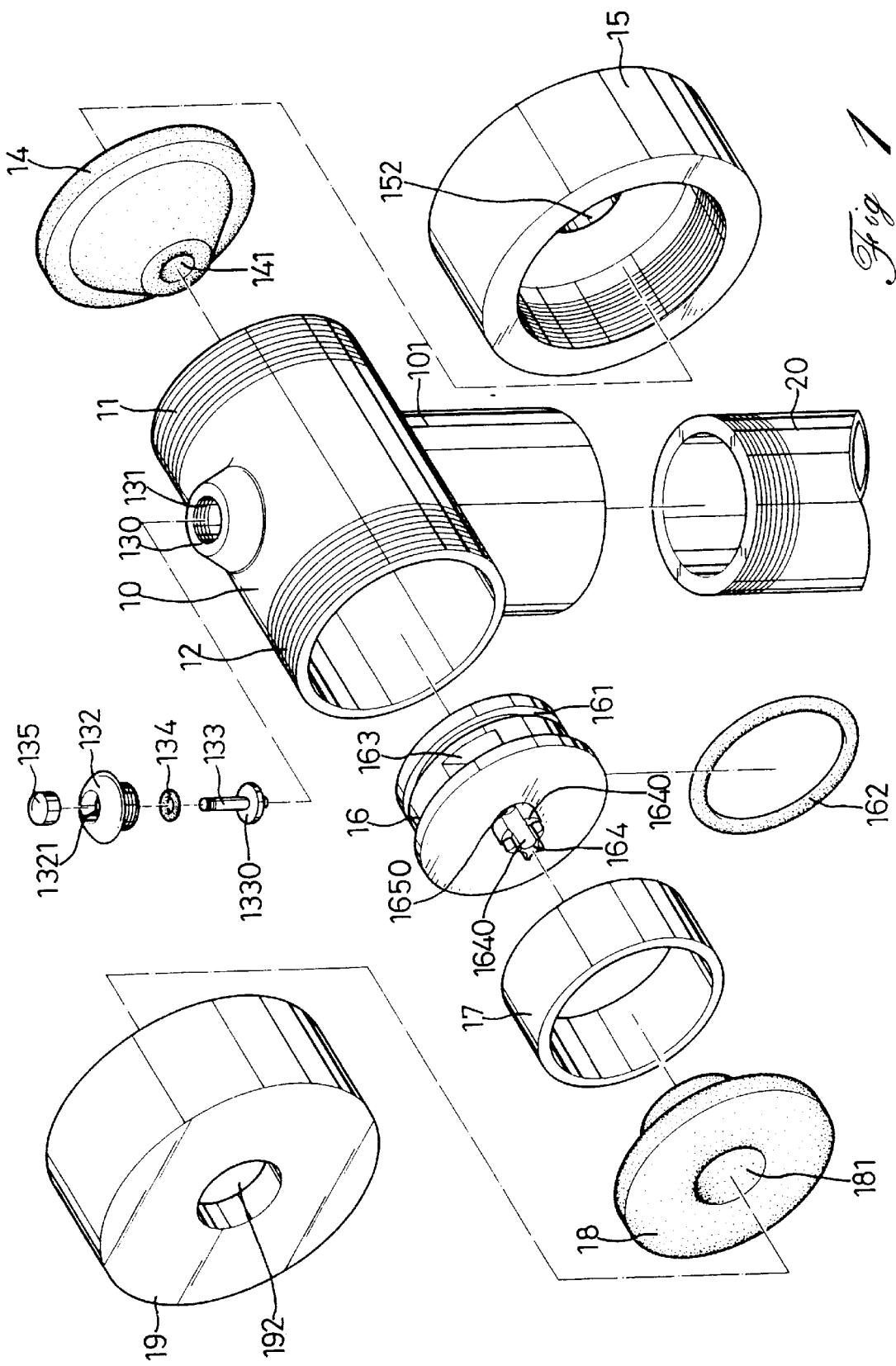
FIG. 1 is an exploded view of a tire inflator in accordance with the present invention.
Figure 2:
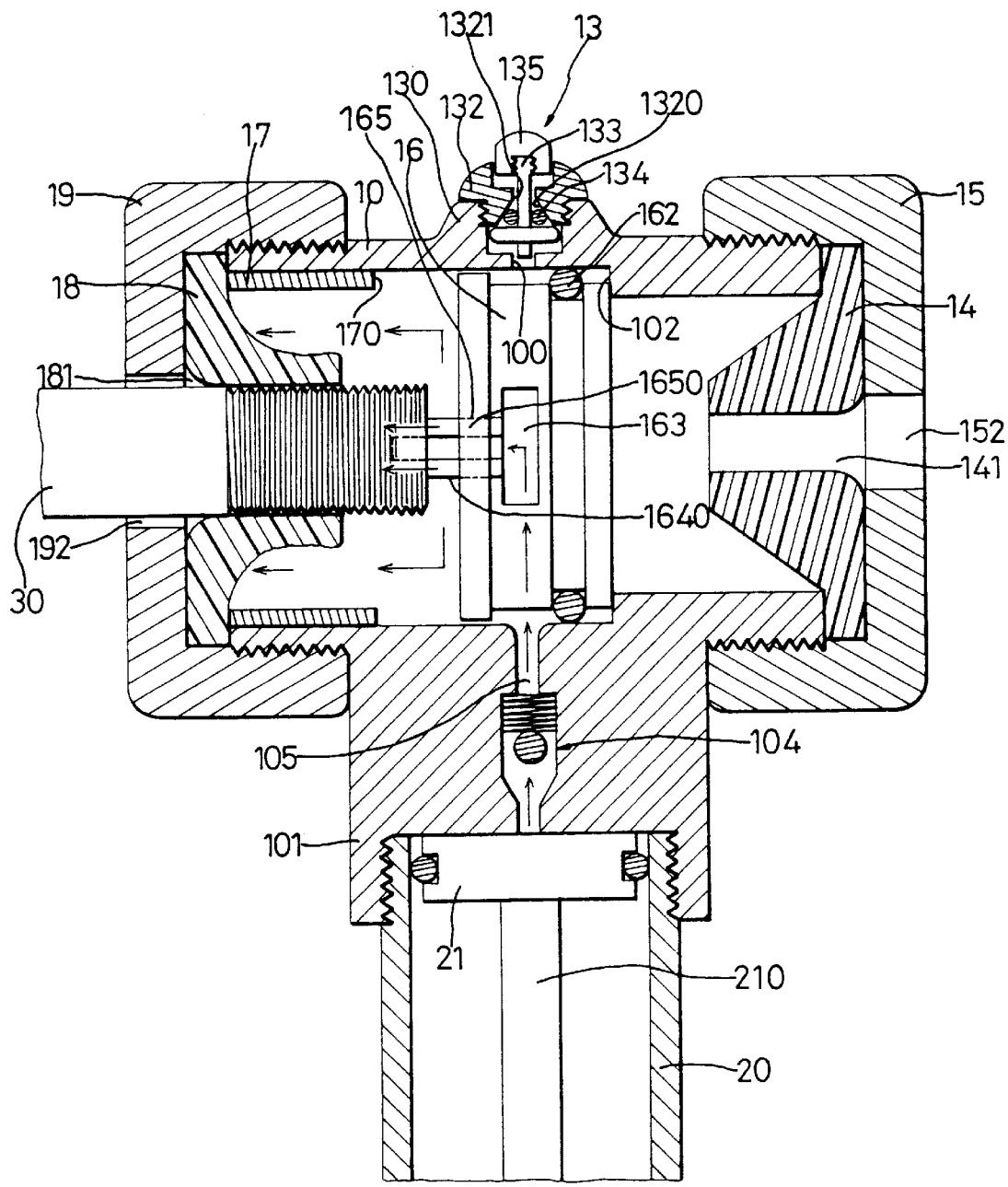
FIG. 2 is a side elevational view, partly in section, of the tire inflator in which an American type of inlet valve is inserted into a second receiver of the tire inflator.

Referring to the drawings and initially to FIGS. 1 and 2, a tire inflator in accordance with the present invention generally includes a head portion 10 having a neck portion 101 extending transversely from a middle portion thereof and a cylinder portion 20 which is threadedly connected to the neck portion 101 and has a piston 21 with a piston rod 210 slidably received therein. The neck portion 101 has a first passage 105 defined therethrough and communicates with an interior of the head portion 10, wherein a uni-directional valve 104 is disposed in the first passage 105 so that air in the cylinder portion 20 is able to enter into the head portion 10 via the first passage 105. The head portion 10 is a tube with two open ends for a first receiver 14 and a second receiver 18 being respectively received in the two open ends. An extending portion 130 extends transversely from the head portion 10 and has a threaded hole 131 defined therethrough which communicates with an opening 100 defined transversely through the head portion 10 so that a release valve 13 is received in the opening 100 and the threaded hole 131 of the extending portion 130.

The head portion 10 has two threaded portions 11, 12 respectively defined in an outer periphery of two ends thereof so that two caps 15, 19 each having a central hole 152/192 defined therethrough are respectively threadedly engaged to the two ends of the head portion 10 to fixedly position the first receiver 14 and the second receiver 18.

Each of the first receiver 14 and a second receiver 18 has a central passage 141/181 defined therethrough so that an American type of inlet valve 30 and a French type of inlet valve 40 are respectively inserted into the central passages 181, 141. The head portion 10 has two shoulder portions 170, 102 extend radially and inwardly from an inner periphery thereof wherein the shoulder portion 170 is formed by a ring member 17 received in the head portion 10.

A disk member 16 is slidably received between the two shoulder portions 170, 102 and has a radial recess 163 defined in a periphery thereof and a slot 165 defined in a first end of the disk member 16, the slot 165 communicating with the radial recess 163. An annular groove 161 is defined in the periphery near a second end of the disk member 16 so as to receive a seal 162 therein. The second end of the disk member 16 has a recess 166 defined therein. A rod 164 having longitudinal grooves 1641 defined therein extends centrally in the slot 165 with at least two ribs 1640 connected radially between the rod 164 and an inner periphery defining the slot 165 so that gaps 1650 are defined between the ribs 164.

The release valve 13 includes a block member 132 threadedly engaged with the threaded hole 131 of the extending portion 130. The block member 132 has a central passage 1321 defined longitudinally therethrough and a coneshaped recess 1320 defined in a bottom thereof and which communicates with the central passage 1321. A pin member 133 has one end thereof connected to a button 135 and the other end thereof a disk 1330 disposed thereto, and a ring seal 134 mounted to the pin member 133 adjacent the disk 1330 so that the ring seal 134 closes the central passage 1321 by contacting the inner periphery defining the cone-shaped recess 1320 when pressured air enters into the head portion 10.

Figure 3:
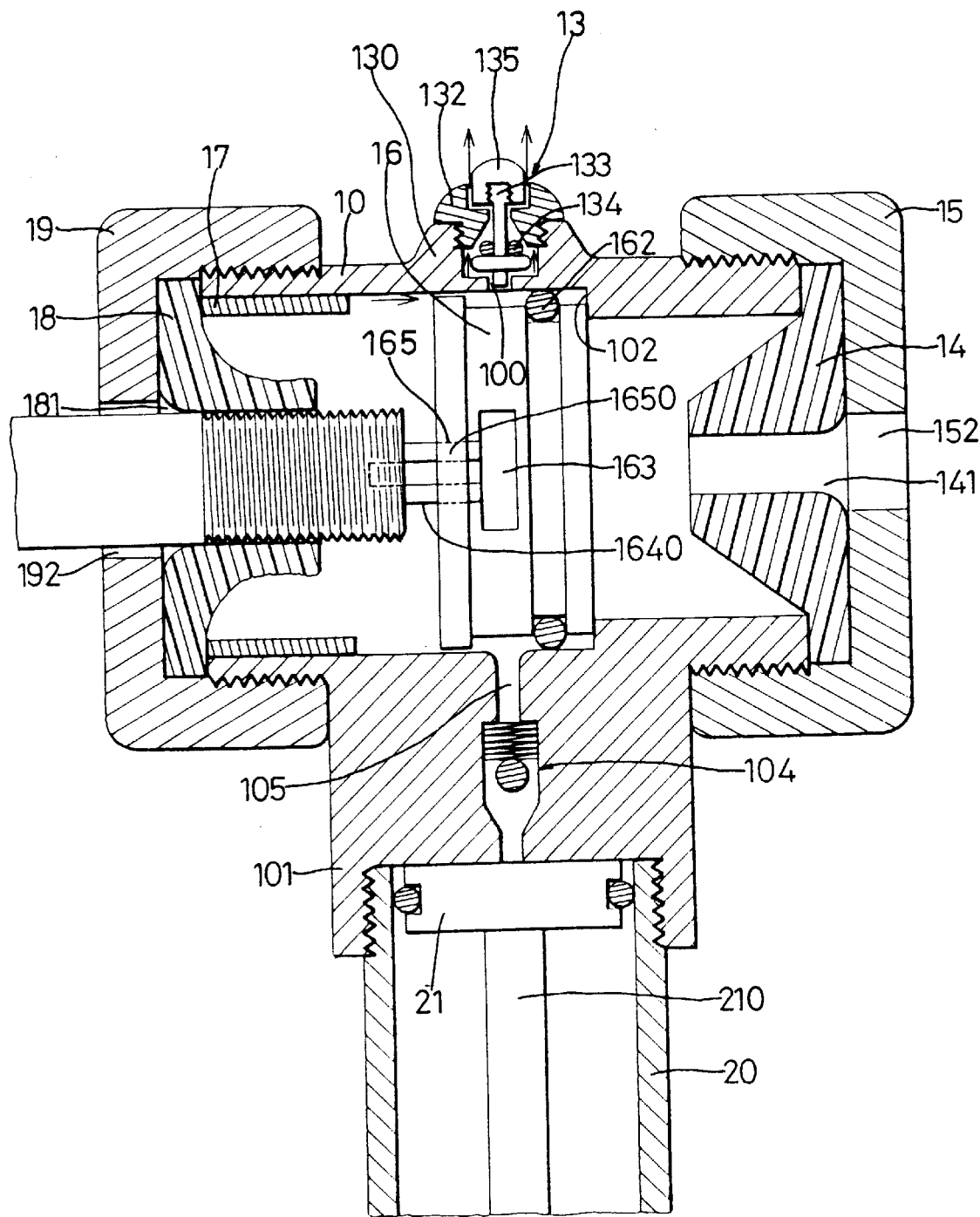
FIG. 3 is a view similar to FIG. 2, wherein a release valve of the tire inflator is operated.

When the American type of inlet valve 30 is inserted into the second receiver 18, the distal end of the inlet valve 30 contacting the ribs 1640 to push the disk member 16 to contact the shoulder portion 102. At this position, the first passage 105 of the neck portion 101 communicates with the radial recess 163 so that air flows into the radial recess 163 and the American type inlet valve 30 via the slot 165, the gaps 1650 and the longitudinal grooves. 1641 mentioned above. In the meanwhile, pressured air also pushes the second receiver 18 to grasp the inlet valve 30 tightly. Referring to FIG. 3, when the inflating action is completed, a user (not shown) pushes the button 135 downwardly to lower the pin member 133 to release pressured air in the head portion 10 from the opening 100, the cone-shaped recess 1320 and the central passage 1321 as shown in FIG. 2.

Figure 4:
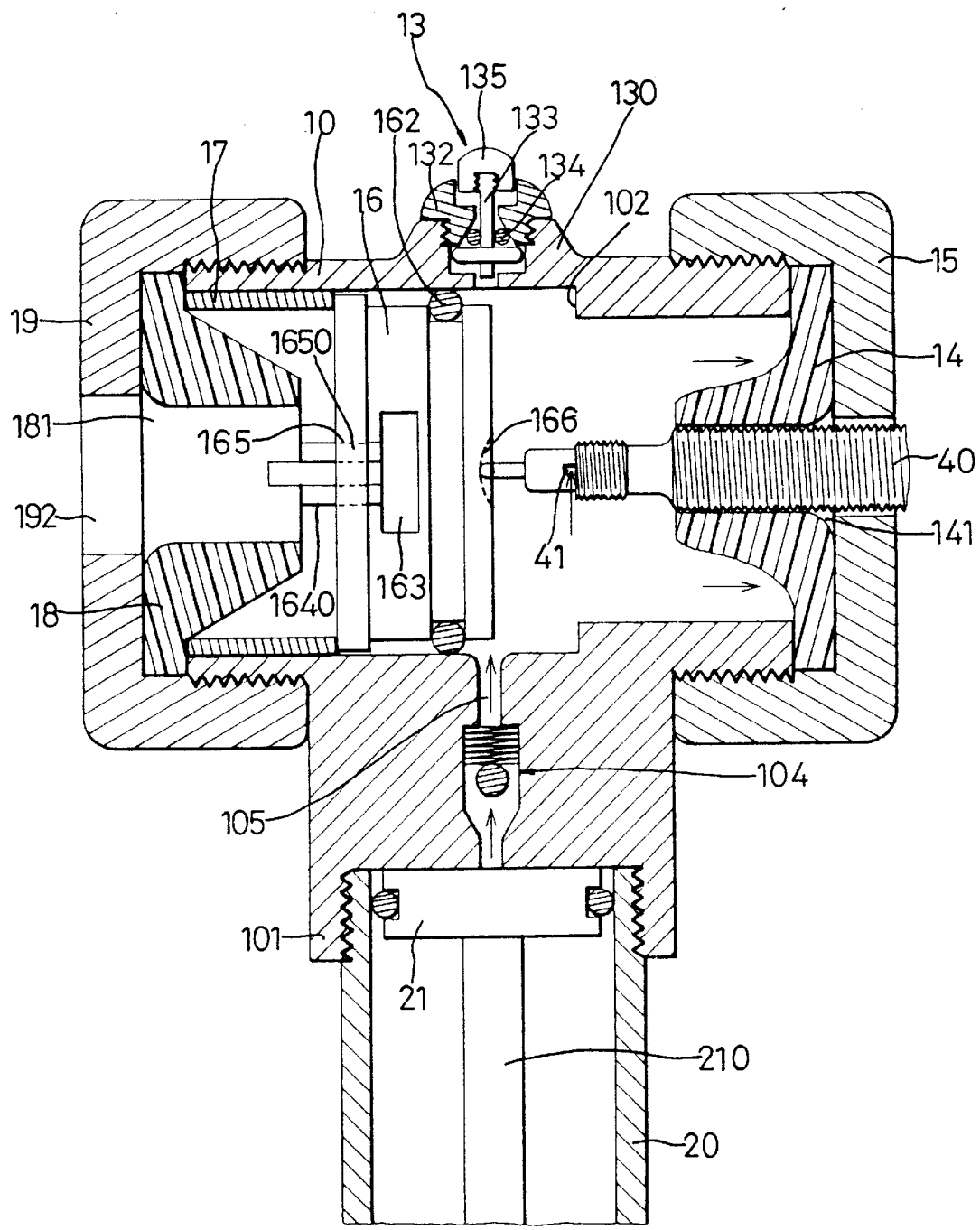
FIG. 4 is a side elevational view, partly in section, of the tire inflator in which a French type of inlet valve is inserted into a first receiver of the tire inflator.

Referring to FIG. 4, when the French type of inlet valve 40 is inserted into the first receiver 14, a distal end of the French type of inlet valve 40 is received in the recess 166 and pushes the disk member 16 to contact the shoulder portion 170 so that pressured air from the first passage 105 enters into the head portion 10 and an inlet 41 defined in the French type of inlet valve 40 to inflate a tire (not shown) connected to the French type of inlet valve 40. Pressured air also forces the first receiver 14 to grasp the French type of inlet valve 40 tightly. The release valve 13 is operated as described in the above to release pressure in the head portion 10 when completing the inflating action.

Accordingly, the tire inflator in accordance with the present invention can be cooperated with different types of inlet valves directly without further actions.

Although the invention has been explained in relation to its preferred embodiment, it is to be understood that many other possible modifications and variations can be made without departing from the spirit and scope of the invention as hereinafter claimed.

What is claimed is:

1. A tire inflator comprising:

a head portion and a cylinder portion which extends transversely from said head portion and has a piston with a piston rod slidably received therein, said head portion being a tube with two open ends and a first passage defined transversely therethrough so as to receive a unidirectional valve therein wherein said first passage communicates with an interior of said cylinder portion, an opening defined transversely through said head portion so as to receive a release valve therein;

a first receiver and a second receiver respectively and fixedly received in said two open ends of said head portion, each of said first receiver and said second receivers having a central passage defined therethrough; and a disk member slidably received in said head portion and having a radial recess defined in a periphery thereof, a slot defined in a first end of said disk member and communicating with said radial recess wherein said head portion has two shoulder portions extending radially and inwardly from an inner periphery thereof so that said disk member slidably received between said two shoulder portions wherein one of said shoulder portions is formed by a ring member received in said head portion.

2. The tire inflator as claimed in claim 1 wherein said head portion has two threaded portions respectively defined in an outer periphery of two ends thereof so that two caps are respectively threadedly engaged to said two ends of the head portion.

3. The tire inflator as claimed in claim 1 wherein a rod extends centrally in said slot with at least two ribs connected radially between said rod and an inner periphery defining said slot.

* * * * *